United States Patent [19]

Kamejima et al.

[11] Patent Number: 4,549,208
[45] Date of Patent: Oct. 22, 1985

[54] PICTURE PROCESSING APPARATUS

[75] Inventors: Kohji Kamejima; Hiroshi Yamamoto, both of Ibaraki; Yoshiyuki Nakano, Hitachi; Masakatsu Fujie, Ibaraki; Taro Iwamoto, Mito; Kazuo Honma, Ibaraki, all of Japan

[73] Assignee: Hitachi, Ltd., Tokyo, Japan

[21] Appl. No.: 563,789

[22] Filed: Dec. 21, 1983

[30] Foreign Application Priority Data

Dec. 22, 1982 [JP] Japan ................................ 57-223766

[51] Int. Cl.⁴ .............................................. H04N 7/18
[52] U.S. Cl. ........................................ 358/108; 358/88
[58] Field of Search ................. 358/108, 87, 225, 140, 358/88; 340/723, 724, 727; 355/47; 364/522; 354/94, 95

[56] References Cited

U.S. PATENT DOCUMENTS

| 3,166,623 | 1/1965 | Waidelich, Jr. | 358/225 X |
| 3,504,122 | 3/1970 | Ratliff, Jr. | 358/88 |
| 3,505,465 | 4/1970 | Rees | 358/87 |
| 4,472,740 | 9/1984 | Doi | 358/55 |

OTHER PUBLICATIONS

"Manipulator Vehicles of the Nuclear Emergency Brigade in the Federal Republic of Germany"; Proceedings of 24th Conference . . . 1976, pp. 196-218.

Primary Examiner—Howard W. Britton
Assistant Examiner—Victor R. Kostak
Attorney, Agent, or Firm—Antonelli, Terry & Wands

[57] ABSTRACT

A picture processing apparatus for use in recognizing an ambient environment as a picture in accordance with the invention, includes a picture input for receiving a distorted picture of a wide angle of view, a picture processing unit which corrects the distorted picture of the wide angle of view from the picture input into an undistorted picture of the wide angle of view, and a display for displaying the undistorted picture of the wide angle of view produced by the picture processing unit.

8 Claims, 10 Drawing Figures

PICTURE PROCESSING APPARATUS

BACKGROUND OF THE INVENTION

The present invention relates to picture processing apparatuses, and more particularly to a picture processing apparatus which can process a picture of wide angle of view at high precision.

In recent years, moving systems such as a moving inspection robot, and intelligent robot etc. have been demanded. For moving systems of this type, it is necessary to function within an environment that is not perfectly known in advance.

An expedient for recognizing the ambient environment of the moving system has heretofore been such that the ambient environment is observed with a television camera or the like, and that an operator or a controlling computer forms a plan for the action of the moving system on the basis of a picture obtained by the observation. An example of such a system is disclosed in "Manipulator Vehicles of the Nuclear Emergency Brigade in the Federal Republic of Germany" contained in the *Proceeding of* 24 *th Conference on Remote Systems Technology,* 1976, pp. 196–218. A serious obstacle to information processing for forming a plan of action lies in the inadequate processing ability of the conventional television camera. More specifically, the performance of the present-day television camera is greatly inferior to that of the human eye. For example, it is known that the human eye can process a picture of wide angle of view and that it can maintain a high resolution for an area worthy of special interest. In order to realize these functions with the television camera, a prior art system uses a lens of narrow angle of view in compliance with a required resolution and changes the direction of the television camera thereby to scan the whole field of view.

This measure, however, must rotate or turn a television camera of great weight over a large angle. It is therefore very difficult to process at high speed a picture corresponding to the whole field of view. There is also a system wherein a large number of television cameras facing in various directions within the whole field of view are positioned for enhancing the picture processing speed. Since, with this system, the moving system is equipped with the large number of television cameras, its weight increases much more, resulting in such problems that the cost rises and that the maneuverability of the moving system degrades.

SUMMARY OF THE INVENTION

An object of the present invention is to provide a picture processing apparatus which can monitor an ambient environment over a wide range.

Another object of the present invention is to provide a picture processing apparatus which can process a picture of wide angle of view at high speed.

A picture processing apparatus for processing a facsimile picture of an ambient environment which is scanned through a wide angle optical system to eliminate optical distortion in the picture that is introduced by the optical system in accordance with the invention, comprises picture input means for producing a facsimile picture of a wide angle of view of the ambient environment which contains optical distortion introduced by the wide angle optical system, picture processing means which corrects the distorted picture of the ambient environment into an undistorted picture of the ambient environment which does not contain the optical distortion introduced by the optical system, and display means for displaying the undistorted picture of the wide angle of view from said arithmetic processing means.

Other objects, advantages and features of the present invention will become more apparent from the following description of embodiments taken with reference to the drawings.

PREFERRED EMBODIMENTS OF THE INVENTION

Now, embodiments of the present invention will be described with reference to the drawings.

Figure 1:
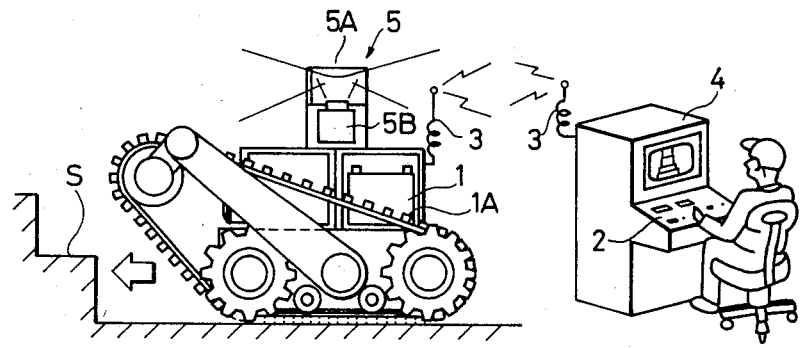
FIG. 1 is a view showing a moving system which is furnished with an example of the apparatus of the present invention.

FIG. 1 shows a moving system which is furnished with an example of the apparatus of the present invention. Referring to the figure, numeral 1 designates the moving system which can travel on a stairway, etc. In this example, the form of a moving object equipped with a crawler 1A is illustrated. Shown at numeral 2 is a console which is installed in a remote place. This console 2 can maneuver the moving system 1 by applying a maneuvering signal to the moving system 1 by means of a transmitter-receiver 3. The console 2 is also provided with a monitor television set 4 which displays a picture of wide angle of view to be described later. The aforementioned moving system is furnished with picture input means 5. The picture of wide angle of view obtained with the picture input means 5 is projected on the monitor television set 4 of the console 2 through the transmitter-receiver 3. As shown in FIG. 1, the picture input means 5 is constructed of a convex mirror 5A and a television camera 5B. Owing to the adoption of the convex mirror 5A, the picture of wide angle of view can be picked up by the television camera 5B.

Figure 2:
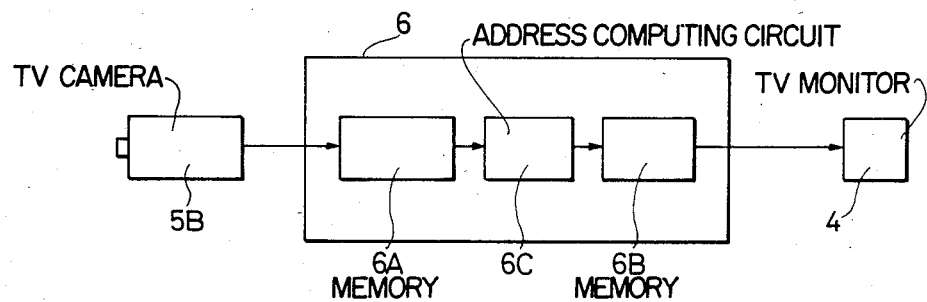
FIG. 2 is a circuit diagram showing the arrangement of a control unit which is used in the apparatus of the present invention.

FIG. 2 shows a control circuit in an example of the apparatus of the present invention. In this figure, the same symbols as in FIG. 1 indicate the same parts. Numeral 6 indicates a picture processing unit which eliminates and compensates the distortion of a picture afforded by the convex mirror 5A. This picture processing unit 6 is constructed of picture memory portions 6A, 6B and a computing circuit 6C. It is possible to install the picture processing unit 6 on the moving system 1 or the console 2. The picture taken by the camera 5B is recorded in the picture memory portion 6A, while the picture with the distortion removed is recorded in the picture memory portion 6B. The computing circuit 6C performs a computation for compensating the distortion of the picture on the basis of a picture position on the convex mirror 5A.

The processing function of the computing circuit 6C will be described with reference to FIG. 3.

Figure 3:
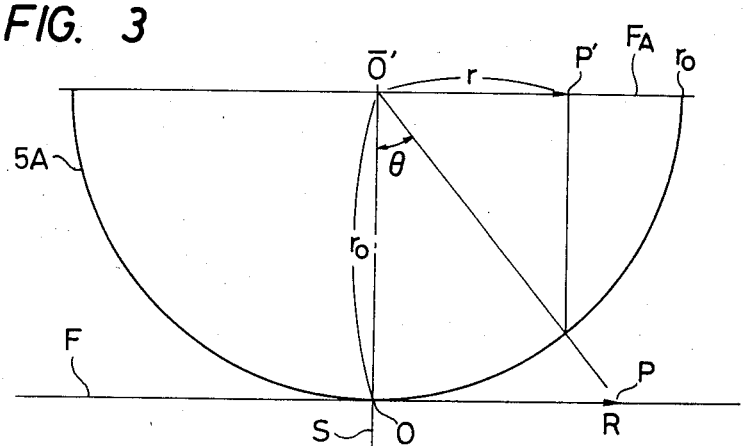
FIG. 3 is an explanatory diagram showing the projective conversion operation of an optical system which is used in the apparatus of the present invention.
Figure 3:
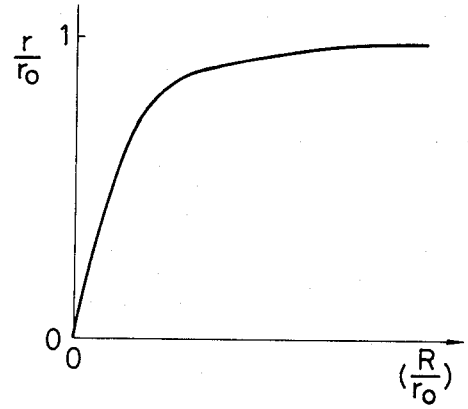

FIG. 3 is an explanatory diagram showing a projective conversion operation by the convex mirror which is used in the apparatus of the present invention. In this figure, the convex mirror 5A projects an image OR within an infinitely extending plane F, on $F_A$ within a circle of radius $r_o$. The projection is done symmetrically with respect to an optic axis S. This signifies that, when the point P of the image OR within the plane F is expressed by a polar coordinate system $P = (R, \theta)$, the projection point P' of the point P on the position $F_A$ is denoted by $(r, \theta)$ in the polar coordinate system. Here, r satisfies the following relation of Equation (1) by way of example:

$$\left(\frac{r}{r_o}\right)^2 = \frac{\left(\frac{R}{r_o}\right)^2}{1 + \left(\frac{R}{r_o}\right)^2} \quad (1)$$

Figure 4:
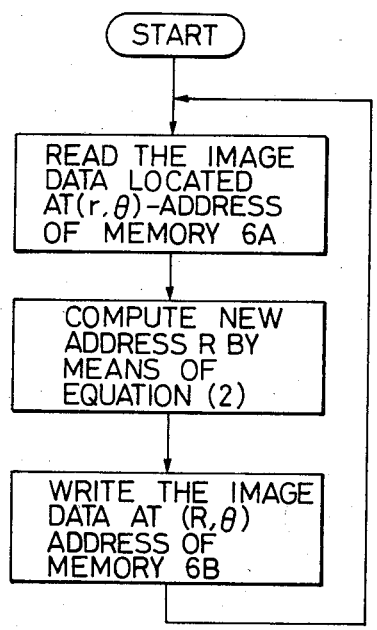
FIG. 4 is a flow chart showing the processing contents of the picture processing unit shown in FIG. 2, which constitutes the apparatus of the present invention.

On the basis of Equation (1), the computing circuit 6C executes processing steps mentioned below. The flow chart of the processing is shown in FIG. 4.

(1) The computing circuit reads image data located at the $(r, \theta)$ address of the picture memory portion 6A. The image data is in the form of a plurality of pixels which comprise the image.

(2) It computes the following equation (2) obtained on the basis of the aforementioned equation (1):

$$R = r_o \sqrt{\frac{\left(\frac{r}{r_o}\right)^2}{1 - \left(\frac{r}{r_o}\right)^2}} \quad (2)$$

where R, $\theta$ identify the pixels.

(3) It writes the image data for each of the pixels of the undistorted image at the $(R, \theta)$ address of the picture memory portion 6B.

Figure 5:
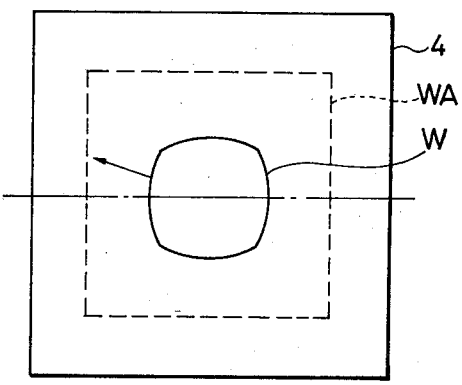
FIG. 5 is a diagram showing a picture of a situation which is obtained with the apparatus of the present invention.

As shown in FIG. 5, the picture obtained by the above processing is the proper picture WA into which the picked-up image W including the distortion has been corrected and which is displayed on the screen of the monitor television set 4. The ambient field of view of the moving system 1 can be grasped by directly viewing the picture WA on the screen of the monitor television set 4.

Figure 6:
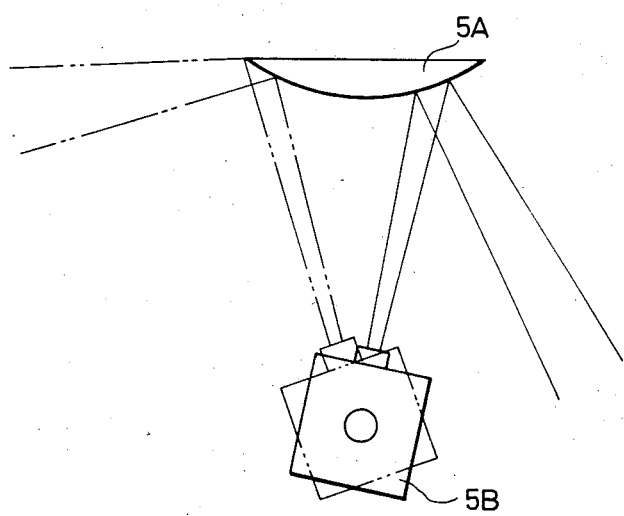
FIGS. 6 to 8 are diagrams each showing drive means for a television camera which is used in the apparatus of the present invention.
Figure 7:
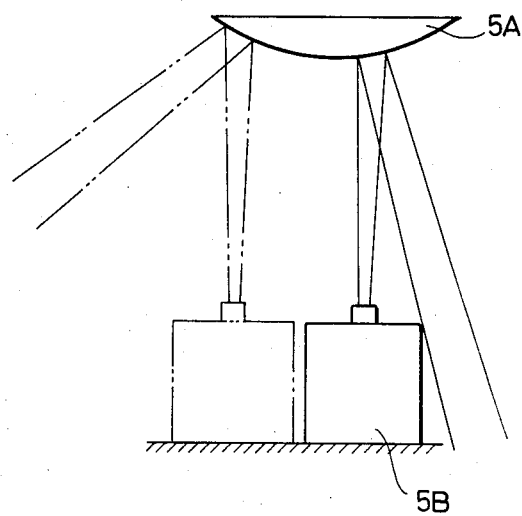
Figure 8:
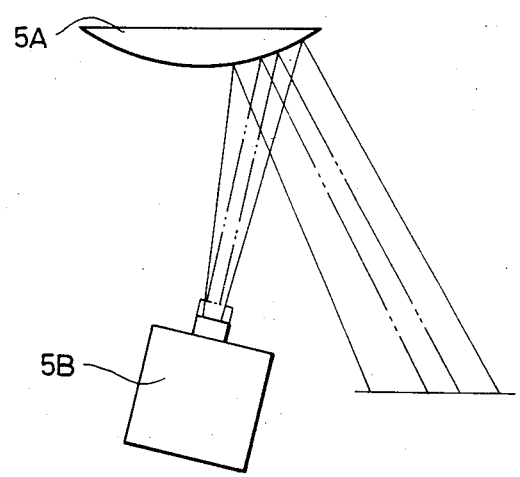

In the above embodiment, the case has been stated where the television camera 5A is held stationary relative to the convex mirror 5A in the view-field picture input means 5. In order to more enlarge the range of the field of view, however, the television camera 5B may be constructed to be rockable relative to the convex mirror 5A as shown in FIG. 6. Further, as shown in FIG. 7, the television camera 5B may be constructed to be movable rectilinearly relative to the convex mirror 5A and translated by an actuator. It is also possible to tilt or more the convex mirror 5A relative to the television camera 5B. Further, only the lens portion of the television camera 5B may be moved as shown in FIG. 8. It is also possible to combine these measures. Since drive means therefor can be readily realized, the details shall be omitted from the description. Moreover, only an area to be noted can be received in the whole field of view of the camera 5B by changing the focal length of the lens of the television camera 5B. The movement of the camera 5B and the adjustment of the focal length in series are executed in accordance with external instructions. The external instructions can be given as the operator's instructions by way of example.

It is to be understood that the invention can be practiced with a mirror other than the convex mirror 5A, for example, a mirror of a cone or polygonal pyramid or a mirror of a circular or polygonal cylinder.

Figure 9:
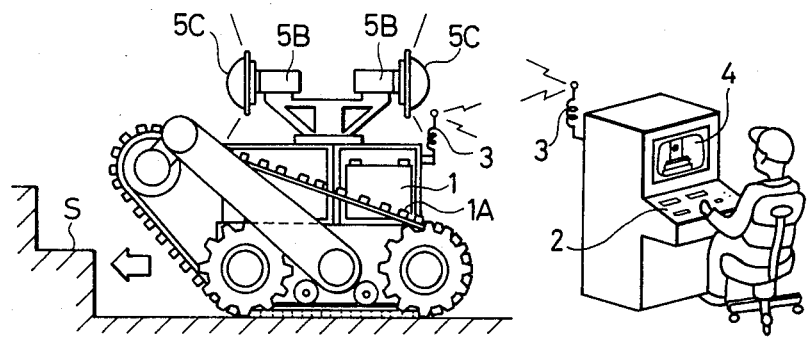
FIG. 9 is a view showing a moving system which is furnished with another example of the apparatus of the present invention.
Figure 10:
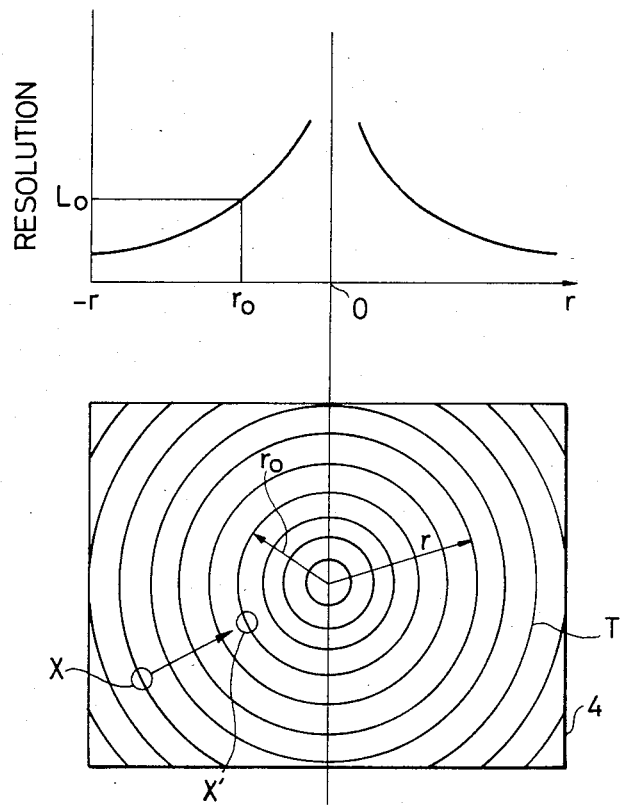
FIG. 10 is a diagram showing the relationship between a picture on a monitor television set and the resolution thereof, the picture being obtained with the example of the apparatus of the present invention shown in FIG. 9.

FIG. 9 shows another example of the apparatus of the present invention. In this figure, the same symbols as in FIG. 1 indicate the same portions. In this embodiment, the picture input means 5 is constructed of fisheye lenses 5C and television cameras 5B. Also in the case of this embodiment, the distorted picture of a wide angle of view can be corrected into the proper picture which is displayed on the monitor television set, by the arrangement of the computing circuitry similar to that in the foregoing embodiment shown in FIG. 1. In the case of this embodiment, since the fisheye lens 5C is used, the picture obtained with the corresponding television camera 5B is more compressed in the area closer to the peripheral edge of the field of view. Thus the resolution of the peripheral part of the picture is degraded. In order to compensate for this drawback, an area of which a high resolution is required may be scanned continually at the center of the screen. However, continually monitoring the subject area at the center of the screen makes it necessary to frequently move the television camera 5B. An expedient for solving this problem will be described with reference to FIG. 10. FIG. 10 shows the relationship between the picture on the monitor television set as afforded by the fisheye lenses and the resolution thereof. T on the picture indicates an equal resolution line, and X, X' indicate subject areas. It is now assumed that the area of which a resolution $L_o$ is required has been picked up at the position X on the screen. In this case, the computing circuitry computes the distance $r_o$ of the equal resolution line corresponding to the preset resolution $L_o$, and the television camera 5B is moved on the basis of the distance $r_o$ so that the area X may come to the position X' on $r_o$.

As described above in detail, according to the present invention, a picture of wide angle of view can be processed at high speed so as to provide a proper picture without distortion. As a result, an ambient environment over a wide range can be monitored.

What is claimed is:

1. A picture processing apparatus for processing a facsimile picture of an ambient environment which is scanned through a wide angle optical system to eliminate optical distortion in the picture that is introduced by the optical system, comprising picture input means for producing a facsimile picture comprised of a plurality of pixels of a wide angle of view of the ambient environment which contains optical distortion introduced by the wide angle optical system, said picture input means being mounted on a movable support means which moves within the ambient environment, picture processing means which corrects the distorted picture of the ambient environment into an undistorted picture of the ambient environment which does not contain the optical distortion introduced by the optical system, said picture processing means having a first picture memory means which stores the pixels of the distorted picture of the ambient environment, a computing means which produces an undistorted picture of the ambient environment by eliminating and compensating the distortion of the picture stored in said first picture memory means for each stored pixel of the distorted picture by computing an address for storage of each stored pixel which will produce the undistorted picture, and a second picture memory means which stores the undistortioned picture produced by said computing means by storing each pixel at the computed address to produce the undistorted picture, display means for displaying the undistorted picture of the wide angle of view from said picture processing means; and said picture processing means and the display means are installed at a position which is remote from the movable support means, and said picture input means and said picture means are coupled together by communication means.

2. A picture processing system in accordance with claim 1 wherein the storage address of each pixel in the second picture memory means is defined in polar coordinates $\theta$ and R where $\theta$ is the angle between the optical axis and a hypotenuse of a right triangle having two additional sides with the first side extending from the center of a convex mirror which is part of the wide angle optical system to a reflective surface of the mirror which intersects the optical axis and the second side of the triangle being defined by the equation $$R = r_o \sqrt{\frac{\left(\frac{r}{r_o}\right)^2}{1 - \left(\frac{r}{r_o}\right)^2}}$$

wherein r is equal to $r_o \sin \theta$ and $r_o$ is a radius of curvature of the convex mirror.

3. A picture processing apparatus according to claim 1, wherein said picture input means comprises an optical viewing means which forms a wide angle of view of the ambient environmment, and a television camera which is disposed in a manner to scan an optic axis of said optical viewing means so as to receive the picture of the wide angle of view from said optical viewing means.

4. A picture processing apparatus according to claim 3, wherein said optical viewing means is a mirror which is convex toward said television camera.

5. A picture processing apparatus according to claim 3, wherein said television camera includes means for creating relative movement between said optical viewing means and the television camera.

6. A picture processing apparatus according to claim 3, wherein said optical viewing means is stationary with respect to said television camera except for a movable lens.

7. A picture processing apparatus according to claim 3, wherein said television camera has a variable focusing means.

8. A picture processing apparatus according to claim 3, wherein said optical viewing means comprises a fisheye lens.

* * * * *